United States Patent Office 2,841,486
Patented July 1, 1958

2,841,486

PLANT DEFOLIATING METHOD EMPLOYING DI-, TRI-, AND TETRATHIOPHOSPHORIC ACID DERIVATIVES

Charles W. Osborn and Lyle D. Goodhue, Bartlesville, Okla., assignors to Phillips Petroleum Company, a corporation of Delaware No Drawing. Application June 22, 1953
Serial No. 363,418

7 Claims. (Cl. 71—2.7)

This invention relates to plant defoliating agents and to their application to the defoliation of plants.

In one aspect of the invention it relates to the provision of certain derivatives of di-, tri-, and tetrathiophosphoric acids as ingredients of defoliating compositions. In another aspect of the invention it relates to the application of di-, tri-, and tetrathiophosphoric acid derivatives to plants, at certain times, to cause defoliation of the same. In still another aspect of this invention there are provided compositions for defoliating plants which comprise as an essential ingredient a derivative of one of di-, tri- and tetrathiophosphoric acid. Other aspects and advantages of the invention are apparent from that which follows.

Plant defoliating agents are used to expedite the harvest of cotton, tomatoes, beans, and other crops. Their purpose is to provide an effect similar to that produced by a light frost which causes dropping of the leaves from the plants. In the case of cotton, defoliation is especially advantageous whether the crop is picked mechanically or by hand. In defoilated cotton the increased exposure to sun and the drying action of air movement cause mature bolls to open faster, prevent or reduce boll rot, and retard fiber and seed deterioration. Picking is facilitated when the plants are defoilated. Mechanical harvesting is more efficient in cotton fields that has been defoliated since leaves which would clog the spindles have already been removed. Other advantages of cotton defoliation are that it aids in insect control, eliminates a source of green leaf stain to lint, and reduces leaf trash which would be difficult to remove from the lint at the gin. Still another advantage of defoliation is that the crop can be harvested earlier, i. e., prior to frost and wet weather conditions, and a beter product can thereby be obtained.

We have discovered that certain derivatives of phosphoric acid, below identified, are effective as plant defoliants. Thus, di- tri- and tetrathiophosphoric acid derivatives which can be represented by the formulas (1)

wherein X is selected from the group consisting of oxygen and sulfur, at least 2 X's being sulfur; wherein R is selected from the group consisting of hydrogen, alkyl, aryl, aralkyl, alkaryl and cycloalkyl groups and not more than one R is hydrogen;

(2)
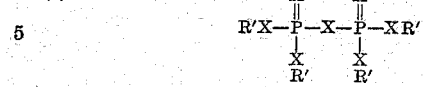

wherein X is selected from the group consisting of oxygen and sulfur with at least 4 X's being sulfur; wherein R' is selected from the group consisting of alkyl, aryl, aralkyl, alkaryl and cycloalkyl groups;

(3)
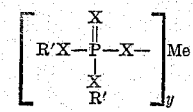

wherein X is selected from the group consisting of oxygen and sulfur with at least 2 X's being sulfur, Me is a metal selected from groups I–A, II–A, II–B, and IV–B of the periodic table (Chemical Rubber Publishing Co., "Handbook of Chemistry and Physics," 31st edition, pages 334–335), $y$ is equal to the valence of Me, and R' is as defined under (2); and (4)
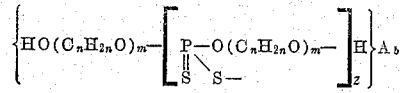

wherein A is selected from the group consisting of hydrogen, $HO(C_nH_{2n}O)_m$—, and a metal as defined under (3) above, $b$ is equal to $$\frac{z}{\text{valence of A}}$$

$n$ is an integer from 2 to 4, $m$ is an integer from 1 to 20, and $z$ is an integer from 1 to 10.

The alkyl groups in the formulas will preferably contain 1–16 carbon atoms, the aryl, aralkyl and alkaryl groups will preferably contain 6–16 carbon atoms and the cycloalkyl groups will contain preferably not in excess of 16 carbon atoms with 5–6 carbon atoms in the ring. Metals include lithium, sodium, potassium; calcium and barium; magnesium, zinc, cadmium, mercury; and tin and lead.

Typical compounds which are applicable include di-n-hexyl dithiophosphoric acid, dilauryl dithiophosphoric acid, trilauryl dithiophosphate, tri-n-butyl dithiophosphate, zinc di-n-hexyl dithiophosphate, zinc di-tetradecyl dithiophosphate, potassium diisopropyl dithiophosphate, dicyclohexyl dithiophosphoric acid, diphenyl dithiophosphoric acid, tribenzyl dithiophosphate, triphenyl trithiophosphate, dicyclohexylphenyl trithiophosphate, di-tert-butylphenyl trithiophosphate, zinc diphenyl dithiophosphate, zinc phenylbenzyl trithiophosphate, diphenyltolyl dithiophosphate, triphenyl tetrathiophosphate, ditolyl dithiophosphoric acid, tri-n-propyl tetrathiophosphate, di-tert-butyl tetrathiophosphoric acid, di-tert-butyl trithiophosphoric acid, tri-n-hexyl trithiophosphate, zinic ditetradecyl trithiophosphate, zinc dihexadecyl dithiophosphate, di-(4-decylphenyl) dithiophosphoric acid, and dimethyl(phenyldecyl) trithiophosphate.

The compounds used according to the invention are well known and can be prepared according to methods available in the literature and can contain various other substituent groups which do not interfere with or detract from the defoliating action of said compounds.

These compounds are effective defoliants when applied to plants in any suitable form such as solutions, emulsions, aerosols, fogs, or dusts. When fogging methods are employed, temperatures in fog generating devices should be below the decomposition temperature of the defoliants. It is convenient to apply the compounds as aqueous emulsions in the form of a spray. These compounds are also advantageously adaptable for application by aircraft as mechanical dispersions or mists produced by high velocity air jet devices.

Any suitable carrier or solvent may be employed which is inert with respect to the active defoliating agent and which will not produce a harmful effect on cotton, tomatoes, beans, or other crops when applied thereto. Certain of the salts, such as the alkali metal salts, are soluble in water and can be applied as aqueous solutions. When the material is not water soluble, it can be applied as a solution in a hydrocarbon oil or in the form of an aqueous emulsion. Carriers or solvents which are particularly applicable and frequently preferred are hydrocarbon oils which boil in the range from about 260 to about 800° F., preferably from 300 to 600° F., and include isoparaffins such as are obtained in the alkylation of paraffins with olefins using such catalysts as hydrogen fluoride, aluminum chloride, sulfuric acid, or the like; also, kerosene, fuel oil, Stoddard solvent, cleaner's naphtha, and diesel fuel. Other solvents or carriers which are applicable are the disulfides, e. g., di-tert-octyl disulfide. Talc, kieselguhr, and other inert carriers can be used in preparing dusts. Water can be used advantageously to form emulsions of the compounds herein described for spraying. When preparing aqueous emulsions, wetting or emulsifying agents such as Triton X100 (alkyl aryl polyether alcohol), Dresinate 731 (sodium salt of a disproportionated rosin acid), Tween 20 (polyoxyalkylene derivative of sorbitan monolaurate), and the like are employed in sufficient quantity to stabilize the emulsion. Oils, as set forth herein, in the emulsion preparations give a better coverage than plain water emulsions. Also water-in-oil emulsions work better than oil-in-water. Such emulsions may be obtained by using an emulsifier such as glycerol sorbitan laurate (Atlox G-672, Atlas Powder Company).

The defoliants of the present invention are effective when applied in amounts in the range between 0.02 and 50 pounds per acre, preferably in amounts in the range between 0.08 and 20 pounds per acre. The amount of carrier can be varied over a broad range. When a liquid carrier, e. g., a hydrocarbon oil of the type described, is employed, the amount of finished solution to be applied per acre is first established and the amount of active ingredient is then adjusted. If it is desired to apply 70 gallons per acre of the finished solution, the quantity of active ingredient is generally in the range between 0.01 and 4 percent by weight, based on the carrier. When emulsions are employed instead of solutions, they contain similar amounts of the active ingredient. If it is desired to apply a smaller quantity finished solution or emulsion per acre, the ratio of active ingredient to carrier is increased.

The defoliants are applied to the leaves of mature cotton or other plants.

*Experimental data—I*

Solutions of several dithiophosphoric acid derivatives of variable concentrations were prepared in different solvents. Two hundred cubic centimeters of each solution was applied by means of a pressurized sprayer to 15 to 20 feet of a row of cotton plants (Delapine-15) which ranged from 18 to 36 inches in height. The amount of solution was sufficient to cover the cotton plants thoroughly. The following table shows the compound tested, solvent employed, concentration of solution and results of defoliation tests. For comparative purposes two runs were made using a commercial product, Endothal (sodium 3,6-endoxy hexahydrophthalate).

| Compound Tested | Solvent | Conc. of Solution, Wt. Percent | Percent Defoliation after— | |
|---|---|---|---|---|
| | | | 1 Week | 2 Weeks |
| Zinc di-n-hexyl dithiophosphate | HF heavy alkylate.[1] | 0.33 | 85 | 98 |
| Do | do | 0.25 | 50 | 99 |
| Do | do | 0.125 | 60 | 99 |
| Do | do | 0.063 | 98 | 100 |
| Do | do | 0.016 | 0 | 93 |
| Do | Kerosene | 0.063 | 97 | 98 |
| Do | do | 0.031 | 90 | 98 |
| Do | Diesel fuel | 0.031 | 70 | 99 |
| Do | Aromatic oil | 0.25 | 90 | 93 |
| Do | do | 0.125 | 85 | 90 |
| Do | Stoddard solvent | 0.25 | 90 | 95 |
| Do | do | 0.125 | 80 | 95 |
| Do | do | 0.063 | 80 | 90 |
| Do | do | 0.016 | 90 | 90 |
| Trilauryl dithiophosphate | HF heavy alkylate | 1 | 98 | 100 |
| Do | do | 0.5 | 95 | 100 |
| Do | do | 0.25 | 80 | 97 |
| Potassium diisopropyl dithiophosphate | Water | 1 | 40 | 90 |
| Do | do | 0.5 | 75 | 95 |
| Do | do | 0.25 | 70 | 97 |
| Di-n-hexyl dithiophosphoric acid | HF heavy alkylate | 0.25 | 95 | 100 |
| Do | do | 0.125 | 50 | 98 |
| Do | do | 0.063 | 50 | 93 |
| Zinc ditetradecyl dithiophosphate | do | 1 | 50 | 98 |
| Do | do | 0.5 | 75 | 99 |
| Endothal | Water | 0.2 | 0 | 30 |
| Do | do | 0.05 | 65 | 65 |
| No treatment | | | | Less than 5. |

[1] Soltrol 180, approximate boiling range 400–500° F.

*Experimental data—II*

A 0.5 weight percent solution of the zinc salt of polyethylene glycol ester of dithiophosphoric acid [1] in a mixture of equal parts of HF heavy alkylate (Soltrol 180) and acetone was prepared and 0.05 cc. portions of the solution spread over the leaves of young bean plants. At the end of twelve days, the plants had been completely defoliated.

Reasonable variation and modification are possible within the scope of the foregoing disclosure and the appended claims to the invention, the essence of which is that certain derivatives of di-, tri-, and tetrathiophosphoric acids, as set forth, have been found to possess excellent defoliating properties and that in certain solvents, as indicated in the experimental data presented, best results have been obtained.

We claim:

1. A method for defoliating cotton which comprises applying to the leaves of said plant when it is mature a composition comprising dispersed in a non-aqueous defoliant adjuvant carrier a defoliating quantity of a compound which can be represented by one of the formulas consisting of:

(1) 

wherein X is selected from the group consisting of oxygen

---

[1] The zinc salt was prepared by refluxing a mixture of 200 grams polyethylene glycol (average molecular weight of 300) with 38.9 grams of P₂S₅ in 1200 cc. benzene for 27 hours. (The polyethylene glycol and P₂S₅ were employed in a mol ratio of 4 to 1.) Nitrogen was then bubbled through the reaction mixture to remove excess hydrogen sulfide. Zinc carbonate was added to the benzene solution of the product, using about 20 percent in excess of the stoichiometric requirement, the mixture was refluxed 15 minutes, filtered, and the benzene removed by distillation. The product was a reddish-brown, viscous liquid. This compound is of the type represented by generic Formula 4.

and sulfur, at least 2 X's being sulfur; wherein R is selected from the group consisting of hydrogen, alkyl, aryl, aralkyl, alkaryl and cycloalkyl groups and not more than one R is hydrogen;

(2) 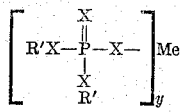

wherein X is selected from the group consisting of oxygen and sulfur with at least 2 X's being sulfur, Me is a metal selected from groups I–A, II–A, II–B, and IV–B of the periodic table, $y$ is equal to the valence of Me, and R' is selected from the group consisting of alkyl, aryl, aralkyl, alkaryl and cycloalkyl groups; and wherein the alkyl groups contain 1–16 carbon atoms, the aryl, aralkyl and alkaryl groups contain 6–16 carbon atoms and the cycloalkyl groups contain not in excess of 16 carbon atoms with 5–6 carbon atoms in the ring.

2. A method according to claim 1 wherein 0.02–50 pounds per acre of the compound is applied.

3. A method for defoliating cotton which comprises applying to the mature plant a defoliating quantity of zinc di-n-hexyl dithiophosphate.

4. A method for defoliating cotton which comprises applying to the mature plant a defoliating quantity of potassium diisopropyl dithiophosphate.

5. A method for defoliating cotton which comprises applying to the mature plant a defoliating quantity of di-n-hexyl dithiophosphoric acid.

6. A method for defoliating cotton which comprises applying to the mature plant a defoliating quantity of trilauryl dithiophosphate.

7. A method for defoliating cotton which comprises applying to the mature plant a defoliating quantity of zinc ditetradecyl dithiophosphate.

References Cited in the file of this patent
UNITED STATES PATENTS

| | | |
|---|---|---|
| 2,063,629 | Salzberg et al. | Dec. 8, 1936 |
| 2,269,396 | Jayne | Jan. 6, 1942 |
| 2,537,608 | Swaney et al. | Jan. 9, 1951 |
| 2,611,729 | Bartlett | Sept. 23, 1952 |
| 2,704,246 | Goodhue et al. | Mar. 15, 1955 |
| 2,736,726 | Goetzi et al. | Feb. 28, 1956 |